(12) United States Patent
Feng et al.

(10) Patent No.: US 11,237,435 B2
(45) Date of Patent: Feb. 1, 2022

(54) DISPLAY PANEL, MANUFACTURING METHOD THEREOF, DISPLAY DEVICE, AND SUBSTRATE

(71) Applicants: BOE Technology Group Co., Ltd., Beijing (CN); Hefei Xinsheng Optoelectronics Technology Co., Ltd., Anhui (CN)

(72) Inventors: Wei Feng, Beijing (CN); Huanyu Li, Beijing (CN)

(73) Assignees: BOE Technology Group Co., Ltd., Beijing (CN); Hefei Xinsheng Optoelectronics Technology Co., Ltd., Anhui (CN)

( * ) Notice: Subject to any disclaimer, the term of this patent is extended or adjusted under 35 U.S.C. 154(b) by 838 days.

(21) Appl. No.: 16/068,491

(22) PCT Filed: Oct. 12, 2017

(86) PCT No.: PCT/CN2017/105877
§ 371 (c)(1),
(2) Date: Jul. 6, 2018

(87) PCT Pub. No.: WO2018/145482
PCT Pub. Date: Aug. 16, 2018

(65) Prior Publication Data
US 2021/0208441 A1 Jul. 8, 2021

(30) Foreign Application Priority Data
Feb. 10, 2017 (CN) .......................... 201710074399.1

(51) Int. Cl.
*G02F 1/1339* (2006.01)
*G02F 1/1341* (2006.01)

(52) U.S. Cl.
CPC ........ *G02F 1/13394* (2013.01); *G02F 1/1339* (2013.01); *G02F 1/1341* (2013.01); *G02F 1/13398* (2021.01)

(58) Field of Classification Search
None
See application file for complete search history.

(56) References Cited

U.S. PATENT DOCUMENTS

2005/0051892 A1* 3/2005 Andoh ............... H01J 29/86
257/724
2016/0026017 A1 1/2016 Wang
(Continued)

FOREIGN PATENT DOCUMENTS

| CN | 102854666 A | 1/2013 |
|---|---|---|
| CN | 104865754 A | 8/2015 |

(Continued)

OTHER PUBLICATIONS

Translation of JP2012185457A (Year: 2012).*
(Continued)

*Primary Examiner* — Phu Vu
(74) *Attorney, Agent, or Firm* — Banner & Witcoff, Ltd.

(57) ABSTRACT

A display panel, a manufacturing method thereof, and a display device are provided. The display panel has a display area and a peripheral area surrounding the display area, the display panel includes a first substrate, a second substrate disposed opposite to the first substrate, and a sealing member. The sealing member is disposed between the first substrate, and the second substrate and located in the peripheral area, and configured to hermetically connect the first substrate and the second substrate, the sealing member includes a first sealant and a first retaining wall, an orthographic projection of the first retaining wall on the second substrate is at least partially overlapped with an orthographic projection of the first sealant on the second substrate, and (Continued)

elastic modulus of a material of the first sealant is greater than elastic modulus of a material of the first retaining wall.

17 Claims, 6 Drawing Sheets

(56) References Cited

U.S. PATENT DOCUMENTS

| | | |
|---|---|---|
| 2016/0370631 A1 | 12/2016 | Tang et al. |
| 2017/0192278 A1 | 7/2017 | Jia |
| 2018/0088374 A1 | 3/2018 | Zhao et al. |

FOREIGN PATENT DOCUMENTS

| | | |
|---|---|---|
| CN | 105511171 A | 4/2016 |
| CN | 105549272 A | 5/2016 |
| CN | 105629589 A | 6/2016 |
| CN | 103792736 B | 8/2016 |
| CN | 106054465 A | 10/2016 |
| JP | 2012168348 A | 9/2012 |
| JP | 2012185457 A | 9/2012 |
| JP | 2017015938 A | 1/2017 |
| KR | 100706768 B1 | 4/2007 |

OTHER PUBLICATIONS

Translation of JP2012168348A (Year: 2012).*
Jul. 17, 2020—(EP) Extended European Search Report Appn 17885434.5.
Sep. 9, 2020—(CN) Refusal Office Action Appn 201710074399.1 with English Translation.
Jan. 19, 2018—(WO) International Search Report and Written Opinion Appn PCT/CN2017/105877 with English Translation.
Y. Yang, et al., "Simulation and Experimental Study on Light Leakage in ADS Mode LCDs", SID 2014 Digest, pp. 1251-1254.
J. You, et al., "Improvement of Dark State Light Leakage in ADS Mode LCDs", SID 2015 Digest, pp. 1544-1547.

* cited by examiner

DISPLAY PANEL, MANUFACTURING METHOD THEREOF, DISPLAY DEVICE, AND SUBSTRATE

The application is a U.S. National Phase Entry of International Application No. PCT/CN2017/105877 filed on Oct. 12, 2017, designating the United States of America and claiming priority to Chinese Patent Application No. 201710074399.1 filed on Feb. 10, 2017. The present application claims priority to and the benefit of the above-identified applications and the above-identified applications are incorporated by reference herein in their entirety.

TECHNICAL FIELD

At least one embodiment of the present disclosure relates to a display panel, a manufacturing method thereof, a display device, and a substrate.

BACKGROUND

TFT-LCD (Thin Film Transistor Liquid Crystal Display) has features of small size, low power consumption, no radiation, and relatively low production cost, and has become the mainstream of current flat panel displays. TFT-LCD includes an array substrate, a color film substrate, and a liquid crystal layer disposed between two display substrates, in which the array substrate and the color film substrate are fixedly connected by a sealant, so as to form a liquid crystal display.

SUMMARY

At least one embodiment of the present disclosure provides a display panel, a manufacturing method thereof, a display device, and a substrate.

At least one embodiment of the present disclosure provides a display panel, the display panel having a display area and a peripheral area surrounding the display area, the display panel including: a first substrate; a second substrate which is disposed opposite to the first substrate, and a sealing member. The sealing member is disposed between the first substrate and the second substrate, located in the peripheral area, and configured to hermetically connect the first substrate and the second substrate, the sealing member includes a first sealant and a first retaining wall, an orthographic projection of the first retaining wall on the second substrate is at least partially overlapped with an orthographic projection of the first sealant on the second substrate, and elastic modulus of a material of the first sealant is greater than elastic modulus of a material of the first retaining wall.

For example, the first retaining wall is disposed on the first substrate, and the first retaining wall is at least one continuous ring of retaining wall surrounding the display area.

For example, in a direction perpendicular to the first substrate, the first sealant is disposed at a side of the first retaining wall away from the first substrate, and is in contact with the first retaining wall.

For example, the display panel provided by the present embodiment further including: a plurality of spacers, located in the display area, and a material of the plurality of spacers is the same as the material of the first retaining wall.

For example, a height of the first retaining wall in a direction perpendicular to the first substrate is the same as a height of the plurality of spacers in a direction perpendicular to the first substrate.

For example, the sealing member further includes: a second retaining wall, in a direction perpendicular to the first substrate, the second retaining wall is disposed between the first sealant and the second substrate, and is in contact with the first sealant; the second retaining wall is a continuous ring of retaining wall surrounding the display area, and the elastic modulus of the material of the first sealant is greater than elastic modulus of a material of the second retaining wall.

For example, the sealing member further includes: a second sealant, in a direction perpendicular to the first substrate, the second sealant is disposed between the first retaining wall and the first substrate, and is in contact with the first retaining wall, elastic modulus of a material of the second sealant is greater than the elastic modulus of the material of the first retaining wall.

For example, a sum of heights of the second retaining wall and the first retaining wall in a direction perpendicular to the first substrate is greater than a height of the first sealant in the direction perpendicular to the first substrate.

For example, in a direction perpendicular to the first substrate, a sum of heights of the first retaining wall and the second retaining wall is equal to a height of the plurality of spacers.

For example, in a direction perpendicular to the first substrate, a height of the first retaining wall is greater than a height of the first sealant.

For example, the material of the first retaining wall includes a fluorine-containing coating resin.

At least one embodiment of the present disclosure provides a manufacturing method of a display panel, including: providing a first substrate; forming a sealing member on the first substrate, forming the sealing member includes forming a first retaining wall on the first substrate, and forming a first sealant on a side of the first retaining wall away from the first substrate, wherein elastic modulus of a material of the first sealant is greater than elastic modulus of a material of the first retaining wall; providing a second substrate; and cell-assembling a side of the first substrate on which the sealing member is formed and the second substrate to form a display panel, wherein the display panel includes a display area and a peripheral area surrounding the display area, the sealing member is formed in the peripheral area to hermetically connect the first substrate and the second substrate.

For example, the first retaining wall is at least one continuous ring of retaining wall surrounding the display area, and forming the sealing member further includes: in a direction perpendicular to the first substrate, forming the first sealant on the side of the first retaining wall away from the first substrate to connect the first retaining wall and the second substrate.

For example, the first retaining wall is at least one continuous ring of retaining wall surrounding the display area, and forming the sealing member further includes: in a direction perpendicular to the first substrate, before forming the first sealant, forming a second retaining wall on the second substrate, and then forming the first sealant on the first retaining wall or the second retaining wall to connect the first retaining wall and the second retaining wall, wherein the second retaining wall is a continuous ring of retaining wall surrounding the display area, and the elastic modules of the material of the first sealant is greater than elastic modulus of a material of the second retaining wall.

For example, the manufacturing method of the display panel provided by the present embodiment further includes: forming a plurality of spacers in the display area of a side of the first substrate facing the second substrate, the plurality of spacers and the first retaining wall are formed through a same patterning process.

For example, forming the sealing member further includes: in a direction perpendicular to the first substrate, before forming the first retaining wall, forming a second sealant on the first substrate, and then forming the first retaining wall on the second sealant, elastic modulus of a material of the second sealant is greater than the elastic modulus of the material of the first retaining wall.

At least one embodiment of the present disclosure provides a display device, including the display panel according to any one of abovementioned embodiments.

At least one embodiment of the present disclosure provides a substrate, including: a base substrate; a sealing member, disposed in a peripheral area of the base substrate, wherein the sealing member includes a first sealant and a first retaining wall, an orthographic projection of the first retaining wall on the base substrate is at least partially overlapped with an orthographic projection of the first sealant on the base substrate, and elastic modulus of a material of the first sealant is greater than elastic modulus of a material of the first retaining wall.

For example, the first retaining wall is disposed on the base substrate, and the first retaining wall is at least one continuous ring of retaining wall.

For example, in a direction perpendicular to the base substrate, the first sealant is disposed at a side of the first retaining wall away from the base substrate, and is in contact with the first retaining wall.

For example, the sealing member further includes: a second retaining wall, in a direction perpendicular to the base substrate, the second retaining wall is disposed on a side of the first sealant away from the base substrate, and is in contact with the first sealant; the second retaining wall is a continuous ring of retaining wall, and the elastic modulus of the material of the first sealant is greater than elastic modulus of a material of the second retaining wall.

For example, the sealing member further includes: a second sealant, in a direction perpendicular to the base substrate, the second sealant is disposed between the first retaining wall and the base substrate, and is in contact with the first retaining wall, elastic modulus of a material of the second sealant is greater than the elastic modulus of the material of the first retaining wall.

For example, in a direction perpendicular to the base substrate, a sum of heights of the second retaining wall and the first retaining wall is greater than a height of the first sealant.

For example, in a direction perpendicular to the base substrate, a height of the first retaining wall is greater than a height of the first sealant.

For example, the material of the first retaining wall includes a fluorine-containing coating resin.

BRIEF DESCRIPTION OF THE DRAWINGS

In order to clearly illustrate the technical solution of embodiments of the present disclosure, the drawings of the embodiments will be briefly described in the following, it is obvious that the drawings in the description are only related to some embodiments of the present disclosure and not limited to the present disclosure.

FIG. 1b is a top view of the liquid crystal display panel along an AB direction illustrated by FIG. 1a;

FIG. 4b is a schematic diagram of a retaining block constituting a strip-like first retaining wall illustrated by FIG. 4a;

FIG. 4c is a top view of the liquid crystal display panel along an AB direction illustrated by FIG. 4a;

FIG. 5b is a top view of the liquid crystal display panel along an AB direction illustrated by FIG. 5a;

FIG. 10b is a sectional view of the substrate along an EF direction illustrated by FIG. 10a;

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. "On," "under," "left," "right" and the like are only used to indicate relative position relationship, and when the position of the object which is described is changed, the relative position relationship may be changed accordingly.

Figure 1A:
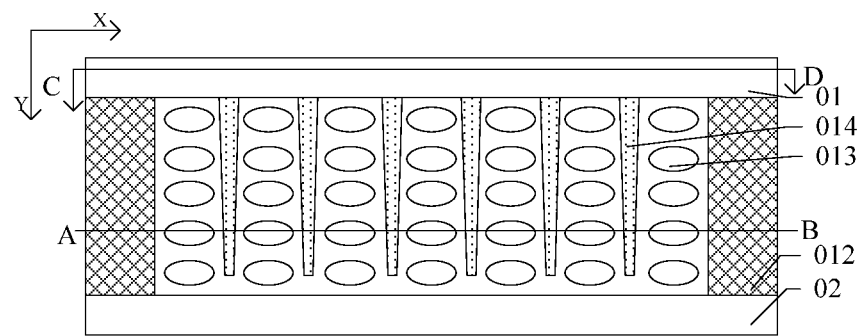
FIG. 1a is a sectional view of a liquid crystal display panel.
Figure 1B:
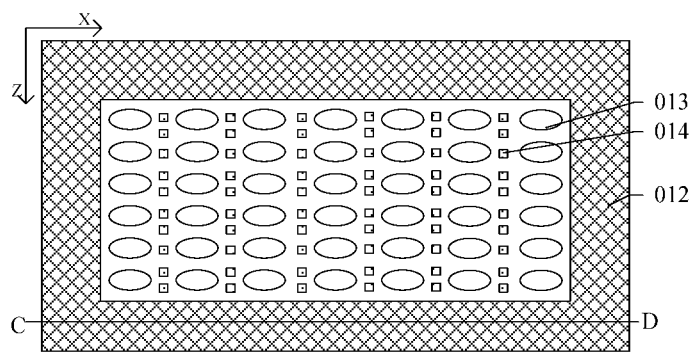

FIG. 1a is a sectional view of a liquid crystal display panel; and FIG. 1b is a top view of the liquid crystal display panel along an AB direction illustrated by FIG. 1a. As illustrated by FIG. 1a and FIG. 1b, the liquid crystal display panel includes a first substrate 01, a second substrate 02 and a liquid crystal layer 013 disposed between the two display substrates. The liquid crystal layer 013 is located in a display area of the liquid crystal display panel, and the display area further includes a spacer 014, which is configured to maintain the uniformity of a cell thickness of the display panel. For example, the spacer 014 may be a photosensitive spacer. A spacer with high positional accuracy formed by a photosensitive composition through a photolithography method, which contains a resin, a polymerizable compound, a photopolymerization initiator, and the like. A sealant 012 is disposed in a peripheral area of the liquid crystal display panel to seal the liquid crystal layer 013. For example, the sealant 012 includes a chemical substance such as a resin, a photopolymerization initiator, a photopolymerization terminator, a hardener, and the like, and plays a corresponding connection role after being cured by a UV (ultraviolet) curing process and a heat curing process. Another role of the sealant 012 is to support the peripheral area of the display panel. Therefore, the sealant 012 needs to be added with a supporter such as a silicon sphere with a certain height. For example, a size of the selected silicon sphere ranges within 3-5 μm.

In a study, the inventor(s) of the present application has found that ADS (Advanced Super Dimension Switch) technology utilizes an electric field formed by edges of slit electrodes located in the same plane and an electric filed formed between the layer of the slit electrodes and a plate electrode layer to form a multiple dimensional electric filed, so as to enable all of liquid crystal molecules with orientations which are located between the slit electrodes and above of the electrodes to rotate horizontally, thereby improving the liquid crystal working efficiency and increasing the light transmittance. ADS liquid crystal molecules are horizontally arranged in a dark state, and have a certain phase retardation amount $\Phi_1$, and $\Phi_1$ is about 320-380 nm. After an ADS liquid crystal display screen with a large size, for example, a television product with a size such as 32-inch, 49-inch, and 65-inch, is manufactured into a module, upon the liquid crystal molecules being in the dark state, a light leakage phenomenon occurs at a peripheral fixed position, upon no signal being applied to the display panel and only the backlight being turned on, light leakage will occur at the peripheral fixed position, which will seriously affect the product quality.

Figure 2:
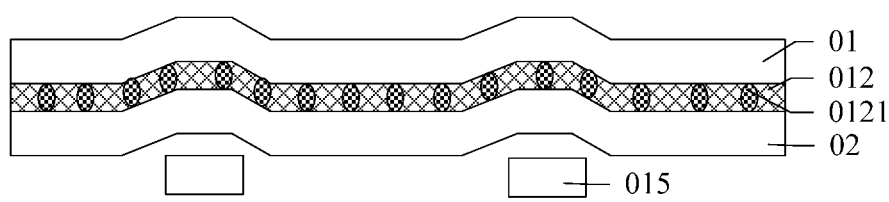
FIG. 2 is a schematic diagram showing a liquid crystal display panel being curved during a curing process.

FIG. 2 is a schematic diagram showing a liquid crystal display panel being curved during a curing process, and FIG. 2 is a sectional view of a peripheral area taken along a Y direction in FIG. 1a and a CD direction illustrated by FIG. 1b. As illustrated by FIG. 2, before the completion of cell-assembling the first substrate 01 and the second substrate 02, the sealant 012 is coated on the peripheral area, and the sealant 012 contains a supporter such as a silicon sphere 0121. Since the display panel needs the support of a support table 015 during processes of cell-assembling and sealant coating, the support table 015 provides uneven support to the display panel, so that the display panel is curved or deformed, and the deformation remains after the sealant 012 is cured. Because the sealant 012 has relatively large viscosity and relatively small elasticity, for example, the elastic modulus is 15 GPa, the uneven support of the support table 015 to the periphery of the display panel results in a large deformation of the sealant 012, which is difficult to recover. After the sealant is cured, the deformation at the periphery of the display panel is preserved. At the time, the first substrate 01 and the second substrate 02 generate a certain phase delay amount $\Phi_2$. For example, the phase retardation amount $\Phi_2$ is about 1 to 10 nm. The combined effect of the phase delay amount $\Phi_2$ generated by the two display substrates and the phase retardation amount $\Phi_1$ generated by the liquid crystal molecules results in a light leakage phenomenon in a dark state at a fixed position in the peripheral area. In the display area, since there is no fixing effect of the sealant, the upper and lower display substrates located in the display area will not generate a phase retardation amount, and the undesirable phenomenon of light leakage in the dark state will not occur.

At another aspect, upon the peripheral area and the display area of the liquid crystal display panel being respectively pressed, it can be found a phenomenon that the variation of brightness and color of the peripheral area of the liquid crystal panel is relatively large during the pressing process, and the variation of brightness and color of the display area of the liquid crystal display panel is relatively small. The sensitivity of the in-plane press is better than that of the peripheral area. Upon the modules of the liquid crystal display panel being assembled, although there is a certain gap between the frame and the liquid crystal display, it is not excluded that the frame squeezes the periphery of the liquid crystal display because the frame is deformed or other reasons. Therefore, the periphery of the liquid crystal display is very likely to produce light leakage.

Figure 3A:
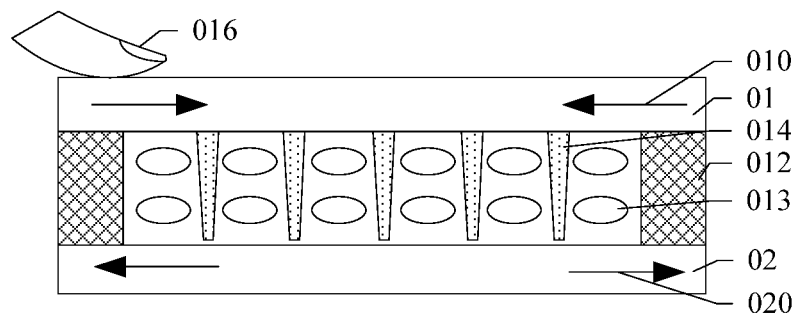
FIG. 3a is a schematic diagram showing a stress effect of a first substrate and a second substrate upon a peripheral area of a liquid crystal display panel being pressed.
Figure 3B:
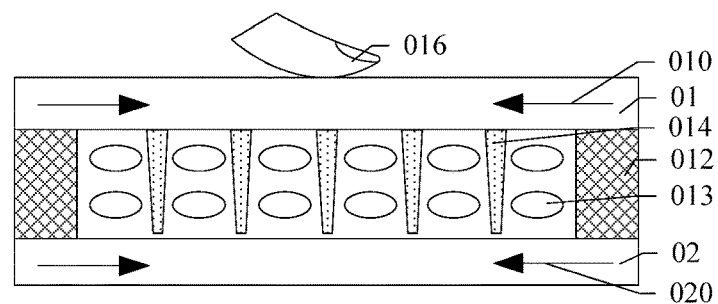
FIG. 3b is a schematic diagram showing s stress effect of a first substrate and a second substrate upon a liquid crystal display area of a liquid crystal display panel being pressed.

FIGS. 3a and 3b respectively illustrate schematic diagrams showing a stress effect of a first substrate and a second substrate upon a peripheral area and a display area of a liquid crystal display panel being pressed. As illustrated by FIG. 3a, upon a finger 016 pressing a peripheral area of the display panel, due to a binding effect of the sealant 012, a direction of a stress 010 subjected by the first substrate 01 is opposite to a direction of a stress 020 subjected by the second substrate 02. Therefore, the upper and lower substrates of the peripheral area of the liquid crystal display panel generate phase retardation, and after superposing the phase retardation amount $\Phi_1$ generated by the liquid crystal molecules, the phase retardation results in a relatively large amount of light leakage to the peripheral area.

As illustrated by FIG. 3b, the finger 016 presses the display area of the display panel, upon the finger 016 pressing the in-plane area of the display panel, due to the elastic supporting effect of the spacer 014 in the in-plane area (for example, the elastic modulus of the spacer 014 is 2.2 GPa), the first substrate 01 and the second substrate 02 stay in a relatively flexible state upon the display panel being pressed, the direction of the stress 010 subjected by the first substrate 01 is the same as the direction of the stress 020 subjected by the second substrate 02. Therefore, the amount of light leakage generated in the in-plane area is relatively small. For example, in a case where the phase retardation $\Phi_1$ of the liquid crystal molecules is selected as 350 nm, since the wavelengths of lights of different colors are different, the amount of light leakage varies, and the amount of light leakage of red light and green light in the peripheral area is relatively large, and the light leakage is yellow after superposition; however, in the in-plane area, the amount of light leakage of blue light is relatively large, and the light leakage is blue after being pressed.

Embodiments of the present disclosure provide a display panel, a manufacturing method thereof, and a display device. The display panel, having a display area and a peripheral area surrounding the display area, includes: a first substrate; a second substrate which is disposed opposite to the first substrate, a sealing member. The sealing member is disposed between the first substrate and the second substrate, located in the peripheral area, and configured to hermetically connect the first substrate and the second substrate, the sealing member includes a first sealant and a first retaining wall, an orthographic projection of the first retaining wall on the second substrate is at least partially overlapped with an orthographic projection of the first sealant on the second substrate, and elastic modulus of a material of the first sealant is greater than elastic modulus of a material of the first retaining wall. By means of adding a first retaining wall in a sealing member, the display panel can increase elasticity of the sealing member to alleviate light leakage phenomenon at a fixed position in the peripheral area of the display panel and reduce the susceptibility to light leakage upon the panel being pressed. In addition, the sealing member plays a supporting role to the display panel to reduce a thickness of a sealant, so as to simplify manufacturing processes of the sealant, such that the first sealant does not need to be added with a supporter such as a silicon sphere and a plastic sphere.

Hereafter, the display panel, the manufacturing method thereof, the display device, and the substrate provided by the embodiments of the present disclosure will be described with reference to the accompanying drawings.

First Embodiment

Figure 4A:
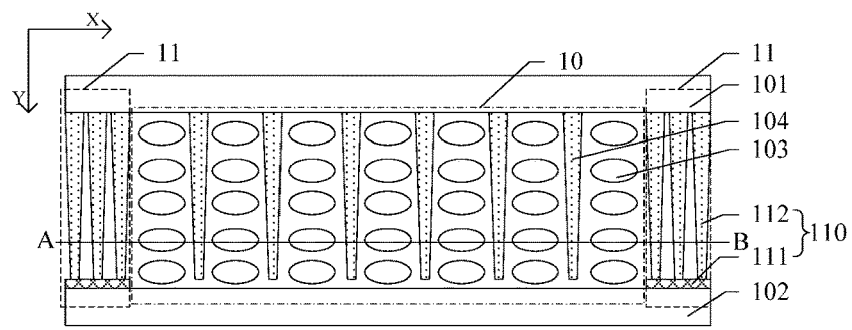
FIG. 4a is a sectional view of a liquid crystal display panel provided by an embodiment of the present disclosure.

FIG. 4a is a sectional view of a liquid crystal display panel provided by the present embodiment. As illustrated by FIG. 4a, the display panel has a display area 10 and a peripheral area 11 surrounding the display area 10. The peripheral area 11 is a non-display area. The display panel includes a first substrate 101, a second substrate 102 disposed opposite to the first substrate 101, and a sealing member 110. For example, the first substrate 101 is a color filter substrate, and the second substrate 102 is an array substrate, which is not limited in the present embodiment. The sealing member 110 is disposed between the first substrate 101 and the second substrate 102 and located in the peripheral area 11, the sealing member 110 surrounds the display area 10 to play a sealing connection role to the first substrate 101 and the second substrate 102. The sealing member 110 includes a first sealant 111 and a first retaining wall 112, and an orthographic projection of the first retaining wall 112 on the second substrate 102 is at least partially overlapped with an orthographic projection of the first sealant 111 on the second substrate 102.

For example, the first sealant 111 can include a chemical substance such as a resin, a photopolymerization initiator, a photopolymerization terminator, a hardener, and the like, and play a corresponding connection role after being cured by a UV curing process and a heat curing process. For example, the first sealant 111 has relatively high viscosity and relatively low elasticity, for example, the elastic modulus is 15 GPa, and the present embodiment is not limited thereto. For example, an overall pressure p is applied to the first sealant 111, and the present pressure is called "volume stress", a volume decrease (−dV) of the first sealant is divided by the original volume V, which is called "volume strain", and the elastic modules: K=P/(−dV/V), is equal to the volume stress divided by the volume strain, in which the unit is megapascals (MPa).

For example, the first retaining wall 112 can be a fluorine-containing coating resin, or the like, and the present embodiment is not limited thereto. For example, the elastic modulus of the first retaining wall 112 is 2.2 GPa, and the present embodiment is not limited thereto.

In the present embodiment, elastic modulus of the material of the first sealant 111 is greater than elastic modulus of the material of the first retaining wall 112, for example, the elastic modulus of the first sealant 111 is 5-10 times of the elastic modulus of the first retaining wall 112, the first retaining wall 112 has better elasticity than the first sealant 111. Therefore, by means of adding a first retaining wall in a sealing member, the display panel can increase elasticity of the sealing member to alleviate light leakage phenomenon at a fixed position in the peripheral area of the display panel and reduce the susceptibility to light leakage upon the panel being pressed. In addition, the sealing member plays a supporting role to the display panel to reduce the thickness of the sealant, so as to simplify manufacturing processes of the sealant, such that the first sealant does not need to be added with a supporter such as a silicon sphere and a plastic sphere.

As illustrated by FIG. 4a, for example, the first retaining wall 112 is disposed on the first substrate 101, and the first retaining wall 112 is at least one continuous ring of strip-shaped retaining wall disposed along the peripheral area 11 and surrounding the display area 10. The present embodiment is not limited thereto, for example, the first retaining wall 112 can also be disposed on the second substrate 102.

For example, a height of the first retaining wall 112 in the direction perpendicular to the first substrate 101 is 3.0-4.5 µm, the height of the first retaining wall 112 in the Y direction is 3.0-4.5 µm, and the present embodiment is not limited thereto.

The first retaining wall 112 shown in FIG. 4a is a plurality of strip-shaped retaining walls. For example, in the sectional view illustrated by FIG. 4a, the strip-shaped first retaining walls 112 can adopt an equal interval design or an unequal interval design, for example, the interval is 100-200 µm, but the present embodiment is not limited thereto. It should be noted that FIG. 4a is only an exemplary schematic diagram. In order to better illustrate the structure in the display panel, FIG. 4a is not entirely based on dimensional proportion of the height and the interval of the strip-shaped retaining walls.

For example, the strip-shaped first retaining wall 112 has a trapezoid shape in the sectional view shown in FIG. 4a, and a length of an edge of the trapezoid shape close to the first substrate 101 is larger than a length of an edge of the trapezoid shape close to the second substrate 102, but the present embodiment is not limited thereto. For example, the sectional view of the strip-shaped first retaining wall 112 can also be a rectangle shape or the like.

For example, in a case where the strip-shaped first retaining wall 112 includes a plurality of rings of retaining walls. The innermost ring of retaining wall is a continuous retaining wall surrounding the display area, a ring of retaining wall close to the liquid crystal layer is a continuous retaining wall, and other outer rings of retaining walls are composed of a plurality of closely-arranged retaining blocks or a plurality of retaining blocks disposed at intervals, and the present embodiment is not limited thereto, as long as at least one ring of the plurality of rings of strip-shaped first retaining walls is a continuous type retaining wall, so as to achieve a sealing effect.

Figure 4B:
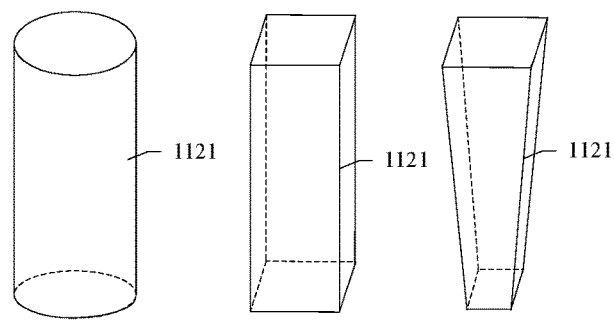

For example, the strip-shaped first retaining wall 112 may be formed by a plurality of retaining blocks, and FIG. 4b is a schematic view of a retaining block constituting the strip-shaped first retaining wall. As illustrated by FIG. 4b, the strip-shaped first retaining wall 112 can be composed of a plurality of cylindrical retaining blocks 1121, and the present embodiment is not limited thereto. For example, the strip-shaped first retaining wall 112 can also be composed by a plurality of columnar retaining blocks 1121, which can be in a shape of cuboid, or a retaining block with a trapezoid sectional view shown in FIG. 4a (the retaining blocks can be in close contact with each other), and the present embodiment is not limited thereto. The retaining blocks 1121 shown in FIG. 4b are retaining blocks used for forming a continuous type strip-shaped retaining wall. If a discontinuous strip-shaped retaining wall is to be formed, a plurality of retaining blocks with a circular table shape or the like can be adopted.

This design adopting the strip-shaped first retaining wall allows the two display substrates to be in a relatively flexible state, the design of the strip-shaped first retaining wall has relatively good elastic recoverability, which can alleviate a light leakage phenomenon at a fixed position in the peripheral area of the display panel and the susceptibility to light leakage upon the panel being pressed.

For example, as illustrated by FIG. 4a, the first sealant 111 is disposed at a side of the first retaining wall 112 away from the first substrate 101 in the direction perpendicular to the first substrate 101 and is connected with the first retaining wall 112. For example, the first sealant 111 can be disposed on the second substrate 102, and the first retaining wall 112 is adhered to the second substrate 102 through the first sealant 111 to achieve a sealing effect. The present embodiment is not limited thereto. For example, the first sealant 111 can also be disposed on the first retaining wall 112.

For example, the height of the first retaining wall 112 in the Y direction is greater than a height of the first sealant 111 in the Y direction. For example, the height of the first sealant 111 in the Y direction is 0.2-0.5 µm, and the present embodiment is not limited thereto. In the present embodiment, a sum of the height of the first retaining wall 112 and the height of the first sealant 111 is consistent with the design of cell thickness of the display panel.

For example, an orthographic projection of surfaces of the plurality of strip-shaped first retaining walls 112 close to the first sealant 111 on the second substrate 102 falls within an orthographic projection of the first sealant 111 on the second substrate 102. The contact area of the first retaining walls 112 and the first sealant 111 is equal to the area of the surfaces of the first retaining walls 112 close to the first sealant 111. The present embodiment is not limited thereto, as long as the first retaining wall is connected with the first sealant, and a sealing member formed by the first retaining wall and the first sealant plays a good sealing connection role to the display panel. The first retaining wall added in the sealing member in the present embodiment plays a role of supporting the display panel, such that the first sealant can be thinned relative to a traditional sealant, and does not need to be added with a supporter such as a silicon sphere, a plastic sphere, so as to simplify the manufacturing processes.

Figure 4C:
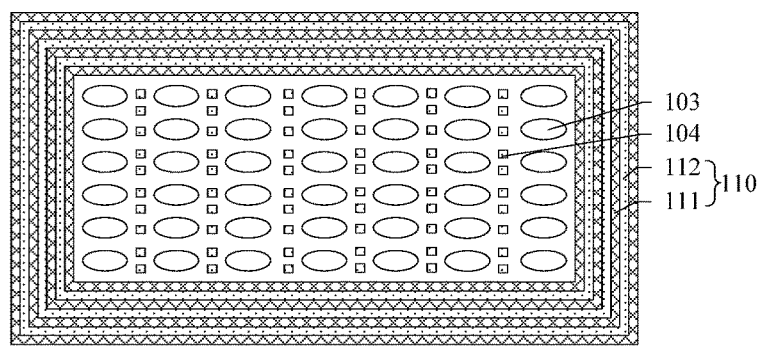

For example, FIG. 4c is a top view of the liquid crystal display panel along an AB direction illustrated by FIG. 4a. As illustrated by FIG. 4c, the first retaining wall 112 can include three continuous rings of strip-shaped retaining walls surrounding the display area 10. The present embodiment is not limited thereto, the first retaining wall can include two or more than three continuous rings of strip-shaped retaining walls surrounding the display area, which can be determined according to the practical size requirements.

For example, as illustrated by FIG. 4c, the display panel further includes a liquid crystal layer 103, and the liquid crystal layer 103 is located in the display area 10. Besides, a plurality of spacers 104 are disposed in the display area 10, the plurality of spacers 104 are disposed in the liquid crystal layer 103, so as to maintain the uniformity of the cell thickness of the display panel.

For example, each spacer 104 can be a photosensitive spacer, a spacer having high positional accuracy formed by a photosensitive composition through a photolithography method, and the spacer 104 includes a resin, a polymerizable compound, a photo-polymerization initiator, and the like, the present embodiment is not limited thereto.

A material of the spacer 104 is the same as the material of the first retaining wall 112, the first retaining wall 112 and the spacer 104 have the same elastic modulus. For example, in the direction perpendicular to the first substrate 101, the height of the first retaining wall 112 is the same as the height of the spacer 104, the height of the first retaining wall 112 in the Y direction is the same as the height of the spacer 104 in the Y direction. For example, the heights of the first retaining wall 112 and the spacer 104 are both 3.0-4.5 µm. The present embodiment includes but is not limited thereto. For example, in the present embodiment, the spacer 104 and the first retaining wall 112 are formed in the same step using a half tone mask process to save the processes.

Figure 5A:
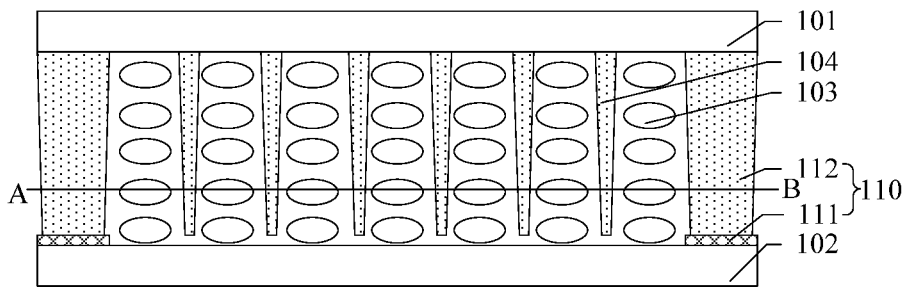
FIG. 5a is a sectional view of another liquid crystal display panel provided by an embodiment of the present disclosure.
Figure 5B:
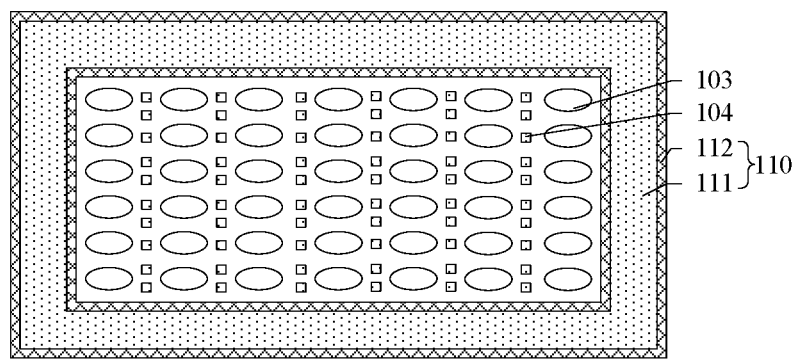

For example, FIG. 5a is a sectional view of a liquid crystal display panel provided by another example of the present embodiment, FIG. 5b is a top view of the liquid crystal display panel along an AB direction illustrated by FIG. 5a. As illustrated by FIG. 5a and FIG. 5b, a first retaining wall 112 is disposed on the first substrate 101, and the first retaining wall 112 is a continuous ring of retaining wall surrounding the display area 10, the first retaining wall 112 is a continuous ring of block-shaped retaining wall disposed along the peripheral area 11. The present embodiment is not limited thereto, for example, a continuous ring of block-shaped first retaining wall 112 surrounding the display area 10 can be further formed on the second substrate 102.

For example, FIG. 5a shows that an orthographic projection of the surface of the first retaining wall 112 close to the first sealant 111 on the second substrate 102 falls within an orthographic projection of the first sealant 111 on the second substrate 102. The present embodiment is not limited thereto, for example, it can also be configured that the orthographic projection of the first sealant 111 on the second substrate 102 falls into the orthographic projection of the surface of the first retaining wall 112 close to the first sealant 111 on the second substrate 102. As long as the first retaining wall is connected with the first sealant, and the sealing member formed by the first retaining wall and the first sealant plays a good sealing connection role to the display panel.

Second Embodiment

What is different from the first embodiment is: the sealing member provided by the present embodiment further includes a second retaining wall, and a height of the first retaining wall in the direction perpendicular to the first substrate in the present embodiment is slightly smaller than that of the first retaining wall in the first embodiment.

Figure 6A:
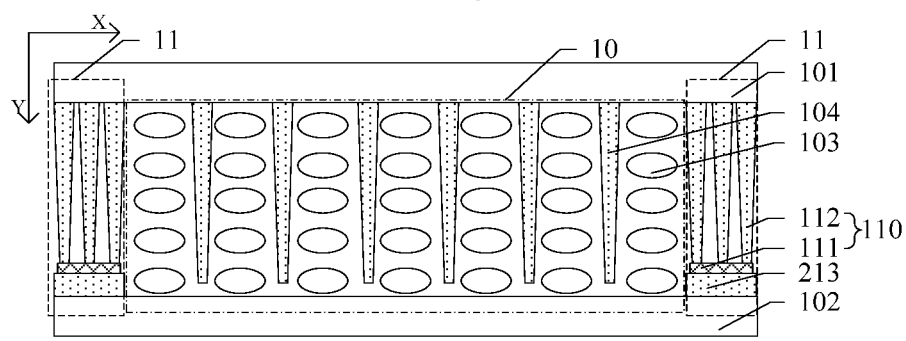
FIG. 6a is a sectional view of another liquid crystal display panel provided by an embodiment of the present disclosure.

FIG. 6a is a sectional view of a liquid crystal display panel provided by the present embodiment. As illustrated by FIG. 6a, the sealing member 110 further includes a second retaining wall 213. The second retaining wall 213 is disposed between the first sealant 111 and the second substrate 102 in a direction perpendicular to the first substrate 101, and is connected with the first sealant 111. The second retaining wall 213 is disposed at a side of the first sealant 111 away from the first retaining wall 112, so as to achieve a sealing effect. For example, the second retaining wall 213 can be disposed on the second substrate 102.

In one example, as illustrated by FIG. 6a, the first retaining wall 112 includes a plurality of continuous rings of strip-shaped retaining walls surrounding the display area 10, and the second retaining wall 213 is a continuous ring of block-shaped retaining wall surrounding the display area 10. For example, the orthographic projection of the first sealant 111 on the second substrate 102 falls within an orthographic projection of the second retaining wall 213 on the second substrate 102. For example, a width of the second retaining wall 213 in the X direction is 1-2 mm, and a width of the first sealant 111 in the X direction is 0.5-1.5 mm, the width of the second retaining wall 213 in the X direction is slightly greater than the width of the first sealant 111 in the X direction, the present embodiment includes but is not limited thereto. This design adopting the strip-shaped first retaining wall allows the two display substrates to be in a relatively flexible state, the design of the strip-shaped first retaining wall has relatively good elastic recoverability, which can alleviate the light leakage phenomenon at a fixed position in the peripheral area of the display panel and the susceptibility to light leakage upon the panel being pressed.

Figure 6B:
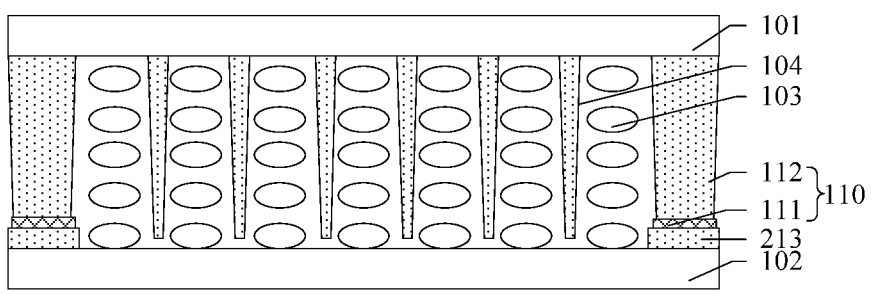
FIG. 6b is a sectional view of another liquid crystal display panel provided by an embodiment of the present disclosure.

The present embodiment is not limited to the design of the strip-shaped first retaining wall. For example, FIG. 6b is a sectional view of a liquid crystal display panel provided by another example of the present embodiment. As illustrated by FIG. 6b, the first retaining wall 112 is a continuous ring of block-shaped retaining wall surrounding the display area 10. Each of the first retaining wall 112 and the second retaining wall 213 is a continuous ring of block-shaped retaining wall surrounding the display area 10.

In the present embodiment, the elastic modulus of the material of the first sealant 111 is greater than elastic modulus of a material of the second retaining wall 213 to increase the elasticity of the sealing member 110, so as to alleviate the light leakage phenomenon at a fixed position in the peripheral area of the display panel and the susceptibility to light leakage upon the panel being pressed.

For example, the material of the second retaining wall 213 is the same as the material of the first retaining wall 112, and the present embodiment is not limited thereto.

For example, in the present embodiment, the height of the first retaining wall 112 in the Y direction is 2-3 µm (slightly less than the height of the first retaining wall 112 in the Y direction in the first embodiment), and a height of the second retaining wall 213 in the Y direction is 1-1.5 µm, and the height of the first sealant 111 in the Y direction can still be selected as 0.2-0.5 µm, the height of the first retaining wall 112 and the height of the second retaining wall 213 both are greater than the height of the first sealant 111, and the present embodiment is not limited thereto. For example, in the present embodiment, a sum of the height of the first retaining wall 112 in the Y direction and the height of the second retaining wall 213 in the Y direction is greater than the height of the first sealant 111 in the Y direction.

In the present embodiment, a sum of the height of the first retaining wall 112, the height of the first sealant 111, and the height of the second retaining wall 213 is consistent with a design of cell thickness of a display panel. As the first retaining wall and the second retaining wall which are added in the sealing member play a role of supporting the display panel, the first sealant can be thinned relative to a traditional sealant, and does not need to be added with a supporter such as a silicon sphere and a plastic sphere, so as to simplify the manufacturing processes.

For example, in the direction perpendicular to the first substrate 101, the sum of the heights of the first retaining wall 112 and the second retaining wall 213 is the same as the height of the spacer 104, the sum of the heights of the first retaining wall 112 and the second retaining wall 213 in the Y direction is the same as the height of the spacer 104 in the Y direction. For example, the height of the spacer 104 and the sum of the heights of the first retaining wall 112 and the second retaining wall 213 are both 3.0-4.5 µm. The present embodiment includes but is not limited thereto, for example, the first retaining wall 112 and the spacer 104 can be formed in the same patterning process by using a half tone mask process to save the processes.

Third Embodiment

What is different from the first embodiment is, the sealing member provided by the present embodiment further includes a second sealant, and a height of the first retaining wall in the direction perpendicular to the first substrate in the present embodiment is slightly smaller than that of the first retaining wall in the first embodiment.

Figure 7A:
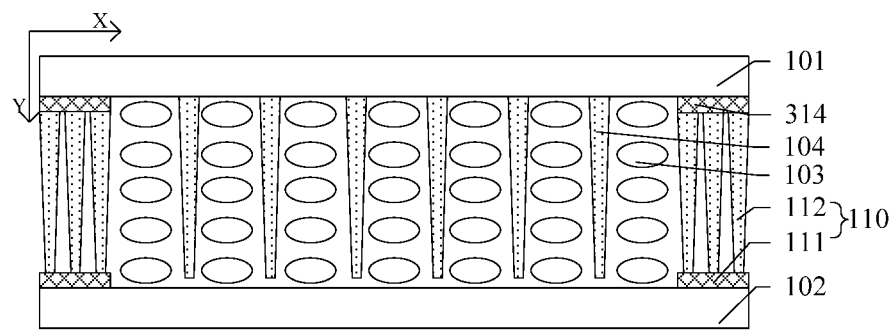
FIG. 7a is a sectional view of another liquid crystal display panel provided by an embodiment of the present disclosure.

FIG. 7a is a sectional view of a liquid crystal display panel provided by the present embodiment. As illustrated by FIG. 7a, in a direction perpendicular to the first substrate 101, a second sealant 314 is disposed between the first retaining wall 112 and the first substrate 101, and is connected with the first retaining wall 112, the second sealant 314 is disposed at a side of the first retaining wall 112 away from the first sealant 111, so as to achieve a sealing effect. For example, the second sealant 314 is disposed on the first substrate 101.

For example, in one example, as illustrated by FIG. 7a, the first retaining wall 112 includes a plurality of continuous rings of strip-shaped retaining walls surrounding the display area. For example, an orthographic projection of the surface of the first retaining wall 112 close to the second sealant 314 on the first substrate 101 falls within the orthographic projection of the second sealant 314 on the first substrate 101, a width of the first retaining wall 112 in the X direction is smaller than a width of the second sealant 314 in the X direction, the present embodiment is not limited thereto, as long as the first retaining wall 112 and the second sealant 314 can achieve a sealing connection effect. This design adopting the strip-shaped first retaining wall allows the two display substrates to be in a relatively flexible state, the design of the strip-shaped first retaining wall has relatively good elastic recoverability, which can alleviate the light leakage phenomenon at a fixed position in the peripheral area of the display panel and the susceptibility to light leakage upon the panel being pressed.

Figure 7B:
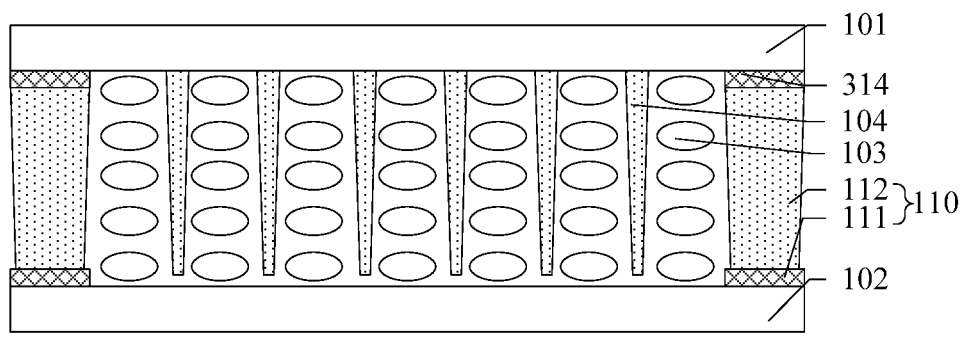
FIG. 7b is a sectional view of another liquid crystal display panel provided by an embodiment of the present disclosure.

The present embodiment is not limited to the design of the strip-shaped first retaining wall. For example, FIG. 7b is a sectional view of a liquid crystal display panel provided by another example of the present embodiment. As illustrated by FIG. 7b, the first retaining wall 112 is a continuous ring of block-shaped retaining wall surrounding the display area 10.

In the present embodiment, elastic modulus of a material of the second sealant 314 is greater than the elastic modulus of the material of the first retaining wall 112, so that the light leakage phenomenon at a fixed position in the peripheral area of the display panel and the susceptibility to light leakage upon the panel being pressed can be alleviated.

For example, the material of the second sealant 314 is the same as the material of the first sealant 111, the present embodiment is not limited thereto.

For example, a height of the second sealant 314 in the Y direction is the same as the height of the first sealant 111 in the Y direction. For example, the heights of the first sealant 111 and the second sealant 314 in the Y direction can be 0.2-0.5 μm, the present embodiment is not limited thereto.

For example, the height of the first retaining wall 112 in the direction perpendicular to the first substrate 101 is 3.0-4.0 μm (slightly less than the height of the first retaining wall 112 in the direction perpendicular to the first substrate 101 in the first embodiment). The present embodiment includes but is not limited thereto. In the present embodiment, the height of the first retaining wall 112 is slightly less than the height of the spacer 104.

In the present embodiment, a sum of the height of the first retaining wall 112, the height of the first sealant 111, and the height of the second sealant 314 is the consistent with the design of cell thickness of the display panel. Since the first retaining wall added in the sealing member plays a role of supporting the display panel, the first sealant and the second sealant can be thinned relative to a traditional sealant, and do not need to be added with a silicon sphere, a plastic sphere, or the like, so as to simplify the manufacturing processes.

Figure 7C:
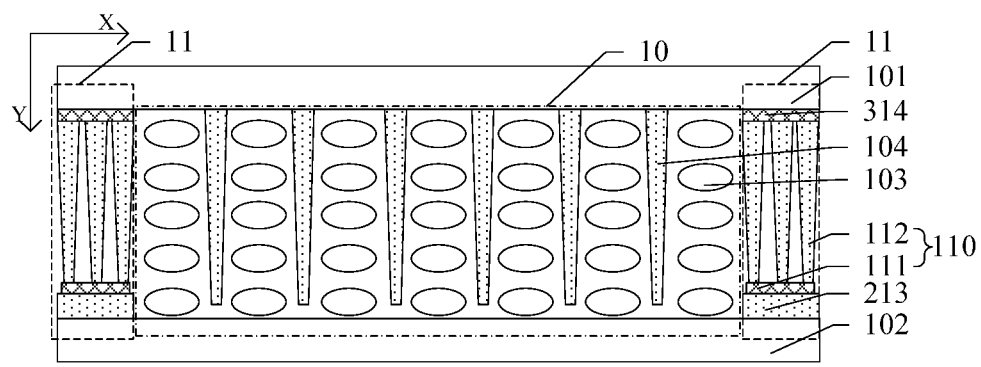
FIG. 7c is a sectional view of another liquid crystal display panel provided by an embodiment of the present disclosure.

For example, FIG. 7c is a sectional view of a liquid crystal display panel provided by another example of the present embodiment. As illustrated by FIG. 7c, a second retaining wall 213 in the second embodiment can also be disposed between the first sealant 111 and the second substrate 102, and the second retaining wall 213 is connected with the first sealant 111, the present embodiment is not limited thereto. It should be noted that the sum of the height of the first retaining wall 112, the height of the first sealant 111, the height of the second retaining wall 213 and the height of the second sealant 314 is consistent with the design of cell thickness of a display panel.

Fourth Embodiment

Figure 8:
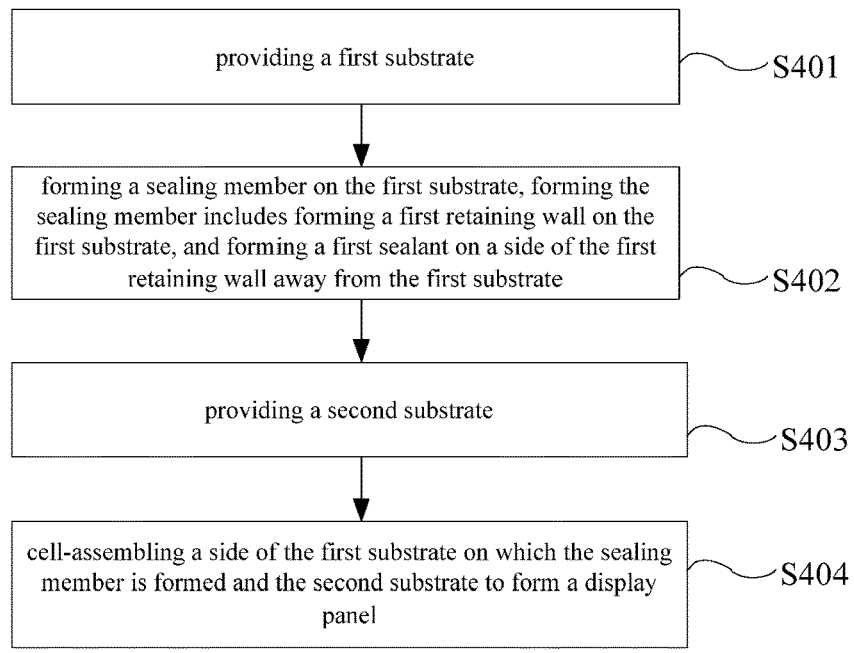
FIG. 8 is a flow diagram of a manufacturing method of a liquid crystal display panel provided by an embodiment of the present disclosure.

The present embodiment provides a manufacturing method of a display panel. As illustrated by FIG. 8, the specific steps of the manufacturing method of the display panel are provided in the following:

S401: providing a first substrate.

For example, the first substrate is a color film substrate, and the present embodiment is not limited thereto. For example, the first substrate can also be an array substrate.

S402: forming a sealing member on the first substrate, forming the sealing member includes forming a first retaining wall on the first substrate, and forming a first sealant on a side of the first retaining wall away from the first substrate.

For example, the first sealant plays a corresponding connection role after being cured by a UV curing process and a heat curing process. For example, the first sealant has relatively high viscosity and relatively low elasticity, for example, the elastic modulus is 15 GPa, the present embodiment is not limited thereto.

For example, the first retaining wall can be a fluorine-containing coating resin or the like, the present embodiment is not limited thereto. For example, the elastic modulus of the first retaining wall is 2.2 GPa, the present embodiment is not limited thereto.

It should be noted that the elastic modulus of the material of the first sealant in the present embodiment is greater than the elastic modulus of the material of the first retaining wall. For example, the elastic modulus of the first sealant is 5-10 times of the elastic modules of the first retaining wall. The first retaining wall has better elasticity than the first sealant. Therefore, by means of adding a first retaining wall in a sealing member, the display panel can increase elasticity of the sealing member to alleviate light leakage phenomenon at a fixed position in the peripheral area of the display panel and reduce the susceptibility to light leakage upon the panel being pressed. In addition, the sealing member plays a supporting role to the display panel to reduce the thickness of the sealant, so as to simplify the manufacturing processes of the sealant, such that the first sealant does not need to be added with a supporter such as a silicon sphere and a plastic sphere.

S403: providing a second substrate.

For example, the second substrate is an array substrate, the present embodiment is not limited thereto. For example, the second substrate can also be a color filter substrate.

S404: cell-assembling a side of the first substrate on which the sealing member is formed and the second substrate to form a display panel.

For example, the display panel includes a display area and a peripheral area surrounding the display area, and the peripheral area is a non-display area. A sealing member is formed in the peripheral area to hermetically connect the first substrate and the second substrate.

For example, forming a liquid crystal layer in a display area of a side of the first substrate facing the second substrate, and cell-assembling the first substrate and the second substrate under vacuum conditions.

For example, the manufacturing method of the display panel provided by the present embodiment further includes: forming a plurality of spacers in the display area, and the spacers and the first retaining wall are formed in the same step, the spacers and the first retaining wall are formed by the same material, so as to save the technological processes.

Figure 9A:
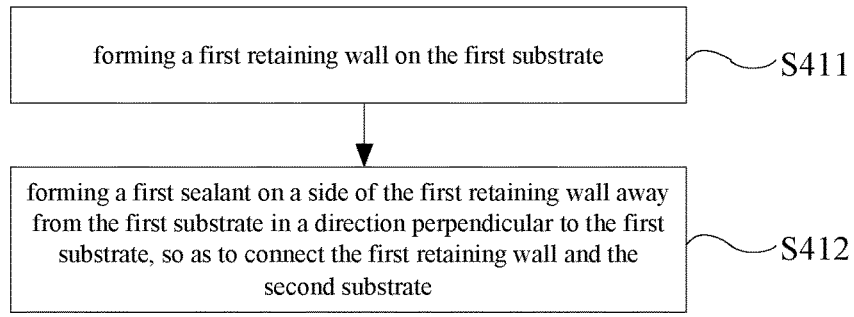
FIG. 9a is a flow diagram of a step of forming a sealing member provided by an example of an embodiment of the present disclosure.

FIG. 9a shows a step of forming a sealing member provided by an example in the present embodiment. As illustrated by FIG. 9a, the specific steps include:

S411: forming a first retaining wall on the first substrate.

For example, coating a material for forming the first retaining wall in the peripheral area of the first substrate, and the first retaining wall provided by the present embodiment is formed by a UV curing process.

For example, the first retaining wall is at least one continuous ring of retaining wall surrounding the display area. For example, the first retaining wall can include a continuous ring of block-shaped retaining wall surrounding the display area or a plurality of continuous rings of strip-like retaining walls surrounding the display area, the present embodiment is not limited thereto.

For example, the strip-shaped first retaining wall (the sectional view illustrated by FIG. 4a) can adopt an equal interval design or an unequal interval design, for example, the interval is 100-200 μm, and the present embodiment is not limited thereto. This design adopting the strip-shaped first retaining wall allows the two display substrates to be in a relatively flexible state, the design of the strip-shaped first retaining wall has relatively good elastic recoverability, which can alleviate the light leakage phenomenon at a fixed position in the peripheral area of the display panel and the susceptibility to light leakage upon the panel being pressed.

S412: forming a first sealant on a side of the first retaining wall away from the first substrate in a direction perpendicular to the first substrate, so as to connect the first retaining wall and the second substrate.

For example, the first sealant is coated in the peripheral area of the second substrate, and the first retaining wall is adhered with the second substrate by the first sealant to achieve a sealing effect. For example, the first sealant can be formed on the second substrate, or can be formed on the first retaining wall to achieve hermetically adhering the first sealant and the second substrate, and the present embodiment is not limited thereto.

For example, dropping liquid crystal in the display area of the first substrate or the second substrate, and then coating a material used for forming the first sealant in the peripheral area of the second substrate or a side of the first retaining wall facing the second substrate, and cell-assembling the first substrate and the second substrate under vacuum conditions, and the material for forming the first sealant is cured by a UV curing process and a heat curing process, so as to achieve a sealing connection effect. By means of adding a first retaining wall in a sealing member, the display panel can increase elasticity of the sealing member to alleviate light leakage phenomenon at a fixed position in the peripheral area of the display panel and reduce the susceptibility to light leakage upon the panel being pressed. In addition, the sealing member plays a supporting role to the display panel to reduce the thickness of the sealant, so as to simplify the manufacturing processes of the sealant, such that the first sealant does not need to be added with a supporter such as a silicon sphere and a plastic sphere.

For example, the height of the first retaining wall in the direction perpendicular to the first substrate is 3.0-4.5 μm, and the height of the first sealant in the direction perpendicular to the first substrate is 0.2-0.5 μm, i.e., the height of the first retaining wall is greater than the height of the first sealant, which is not limited in the present embodiment.

For example, the height of the first retaining wall in the direction perpendicular to the first substrate is the same as the height of the spacer in the direction perpendicular to the first substrate. For example, the height of the first retaining wall and the height of the spacer are both 3.0-4.5 μm, the present embodiment includes but is not limited thereto. For example, the first retaining wall and the spacer can be formed by using the same patterning process to save the processes.

In the present embodiment, a sum of the height of the first retaining wall and the height of the first sealant is the consistent with the design of the cell thickness of the display panel.

Figure 9B:
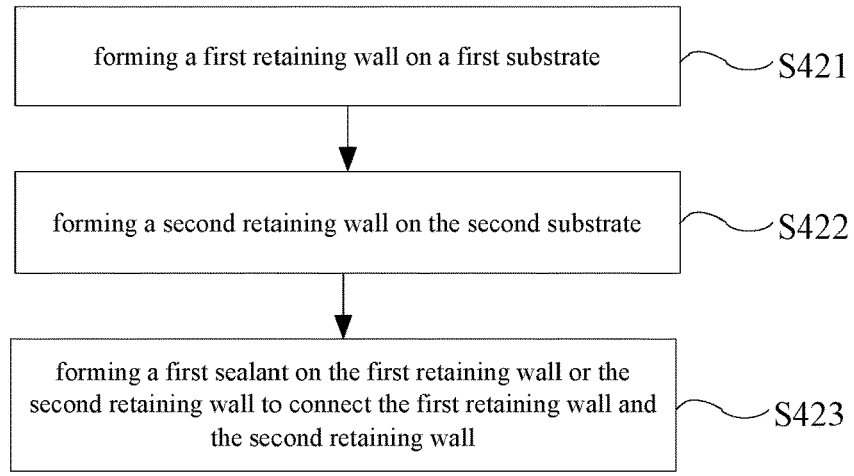
FIG. 9b is a flow diagram of a step of forming a sealing member provided by another example of an embodiment of the present disclosure.

FIG. 9b shows a step of forming a sealing member provided by another example of the present embodiment. As illustrated by FIG. 9b, the specific steps include:

S421: forming a first retaining wall on a first substrate.

For example, the first retaining wall is at least one continuous ring of retaining wall surrounding the display area. For example, the first retaining wall can include a continuous ring of block-shaped retaining wall surrounding the display area or a plurality of continuous rings of strip-like retaining walls surrounding the display area, the present embodiment is not limited thereto.

S422: forming a second retaining wall on the second substrate.

For example, coating a material for forming the second retaining wall in the peripheral area of the second substrate, and the second retaining wall provided by the present embodiment is formed by a UV curing process.

For example, the second retaining wall is a continuous ring of block-shaped retaining wall surrounding the display area.

S423: forming a first sealant on the first retaining wall or the second retaining wall to connect the first retaining wall and the second retaining wall.

For example, dropping liquid crystal in the display area of the first substrate or the second substrate, and then coating the first sealant on the first retaining wall or the second retaining wall, and cell-assembling the first substrate and the second substrate under vacuum conditions, and the first sealant is cured by a UV curing process and a heat curing process, so as to achieve a sealing connection effect.

For example, the material of the second retaining wall is the same as the material of the first retaining wall, the present embodiment is not limited thereto.

In the present embodiment, the elastic modulus of the material of the first sealant is greater than the elastic modulus of the material of the second retaining wall to increase the elasticity of the sealing member, so as to alleviate the light leakage phenomenon at a fixed position in the peripheral area of the display panel and the susceptibility to light leakage upon the panel being pressed.

For example, in the present embodiment, the height of the first retaining wall in the direction perpendicular to the first substrate is 2-3.0 μm, and the height of the second retaining wall in the direction perpendicular to the first substrate is 1-1.5 μm, and the height of the first sealant can still be 0.2-0.5 μm, the present embodiment is not limited thereto.

In the present embodiment, the sum of the height of the first retaining wall, the height of the first sealant, and the height of the second retaining wall is the consistent with the design of the cell thickness of the display panel. Since the first retaining wall and the second retaining wall added in the sealing member play a role of supporting the display panel, the first sealant can be thinned relative to a traditional sealant, and is not added with a silicon sphere, a plastic sphere, or the like, so as to simplify the manufacturing processes.

For example, the sum of the height of the first retaining wall and the second retaining wall in the direction perpendicular to the first substrate is the same as the height of the spacer in the direction perpendicular to the first substrate. For example, the sum of the heights of the first retaining wall and the second retaining wall, and the height of the spacer are both 3.0-4.5 μm. The present embodiment includes but is not limited thereto. For example, the first retaining wall and the spacer can be formed in the same patterning process by using a half tone mask process to save the processes.

Figure 9C:
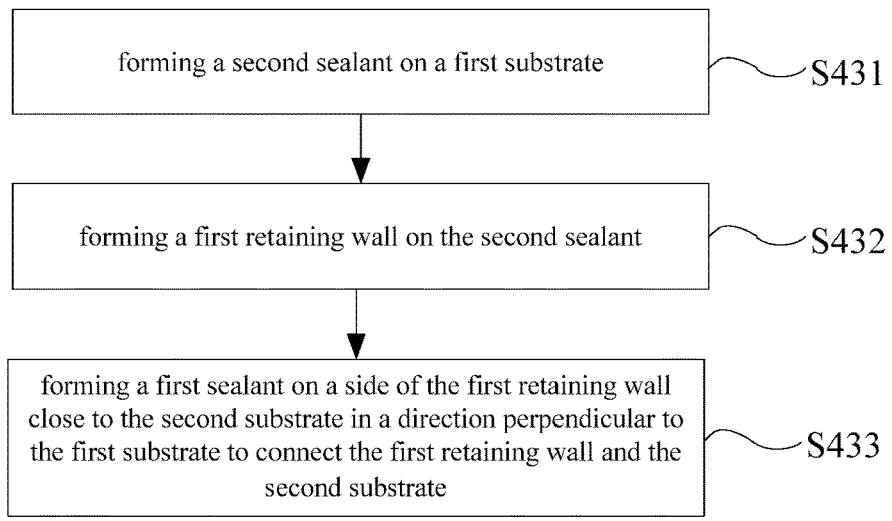
FIG. 9c is a flow diagram of a step of forming a sealing member provided by another example of an embodiment of the present disclosure.

FIG. 9c shows a step of forming a sealing member provided by another example of the present embodiment. As illustrated by FIG. 9c, the specific steps include:

S431: forming a second sealant on a first substrate.

For example, coating a material for forming a second sealant in a peripheral area of the first substrate, and the second sealant provided by the present embodiment is formed after being cured by a UV curing process and a heat curing process.

S432: forming a first retaining wall on the second sealant.

For example, coating a material for forming the first retaining wall on the second sealant, and the first retaining wall provided by the present embodiment is formed after being cured by a UV curing process.

S433: forming a first sealant on a side of the first retaining wall close to the second substrate in a direction perpendicular to the first substrate to connect the first retaining wall and the second substrate.

For example, dropping liquid crystal in the display area of the first substrate or the second substrate, and then forming the first sealant on the second substrate or the first retaining wall, and cell-assembling the first substrate and the second substrate under vacuum conditions, and the first sealant is cured by a UV curing process and a heat curing process, so as to achieve a sealing connection effect.

For example, an orthographic projection of a surface of the formed first retaining wall close to the second sealant on the first substrate falls within an orthographic projection of the second sealant on the first substrate. The present embodiment is not limited thereto.

In the present embodiment, the elastic modulus of the material of the second sealant is greater than the elastic modulus of the material of the first retaining wall, so as to alleviate the light leakage phenomenon at a fixed position in the peripheral area of the display panel and the susceptibility to light leakage upon the panel being pressed.

For example, the material of the second sealant is the same as the material of the first sealant, the present embodiment is not limited thereto.

For example, the height of the second sealant in the direction perpendicular to the first substrate is the same as the height of the first sealant in the direction perpendicular to the first substrate, for example, the height of the first sealant and the second sealant in the direction perpendicular to the first substrate can be selected as 0.2-0.5 µm, the present embodiment is not limited thereto.

For example, the height of the first retaining wall in the direction perpendicular to the first substrate is 3.0-4.0 µm, the present embodiment includes but is not limited thereto. In the present embodiment, the height of the first retaining wall is slightly smaller than the height of the spacer.

In the present embodiment, a sum of the height of the first retaining wall, the height of the first sealant, and the height of the second sealant is the consistent with the design of the cell thickness of the display panel. The first retaining wall added in the sealing member in the present embodiment plays a role of supporting the display panel, so that the first sealant and the second sealant can be thinned relative to a traditional sealant, and do not need to be added with a silicon sphere, a plastic sphere, or the like, so as to simplify the manufacturing processes.

For example, in the present example, a second retaining wall illustrated by step S422 can be formed between the first sealant and the second substrate, and the second retaining wall is connected with the first sealant, and the present embodiment is not limited thereto. A sum of the height of the first retaining wall, the height of the first sealant, the height of the second retaining wall, and the height of the second sealant is the consistent with the design of the cell thickness of the display panel.

Fifth Embodiment

The present embodiment provides a display device, which includes the display panel provided by any one of the above embodiments. The use of the display device can effectively alleviate the light leakage phenomenon at a fixed position in the peripheral area of the display panel and the susceptibility to light leakage upon the panel being pressed, thereby achieving a better display effect.

For example, the display device can be any product or component having a display function such as a liquid crystal display device, a television, a digital camera, a mobile phone, a watch, a tablet computer, a notebook computer, and a navigator which include the display device. The present embodiment is not limited thereto.

Sixth Embodiment

Figure 10A:
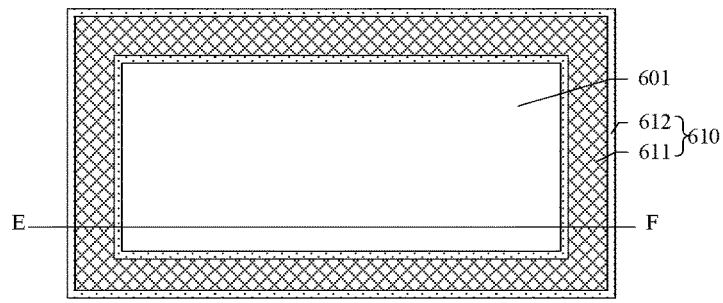
FIG. 10a is a planar view of a substrate provided by an embodiment of the present disclosure.
Figure 10B:

The present embodiment provides a substrate. As illustrated by FIGS. 10a and 10b, the substrate includes: a base substrate 601; a sealing member 610, disposed on the base substrate 601 and located in a peripheral of the base substrate 601, the sealing member 610 includes a first sealant 611 and a first retaining wall 612. An orthographic projection of the first retaining wall 612 on the base substrate 601 is at least partially overlapped with an orthographic projection of the first sealant 611 on the base substrate 601. Elastic modulus of a material of the first sealant 611 is greater than elastic modulus of a material of the first retaining wall 612.

For example, the sealing member in the substrate provided by the present embodiment and the sealing member according to any one of the first to third embodiments can have the same technical features.

For example, the first sealant 611 can include a chemical substance such as a resin, a photopolymerization initiator, a photopolymerization terminator, a hardener, and the like, and play a corresponding connection role after being cured by ultraviolet light and thermally cured. For example, the first sealant 611 has relatively high viscosity and relatively low elasticity, for example, the elastic modulus is 15 GPa, and the present embodiment is not limited thereto.

For example, the first retaining wall 612 can be a fluorine-containing coating resin, or the like, and the present embodiment is not limited thereto. For example, the elastic modulus of the first retaining wall 612 is 2.2 GPa, and the present embodiment is not limited thereto.

For example, as illustrated by FIG. 10a, for example, the first retaining wall 612 is disposed on the base substrate 601, and the first retaining wall 612 is at least one continuous ring of strip-shaped retaining wall.

For example, a height of the first retaining wall 612 in the direction perpendicular to the base substrate 601 is 3.0-4.5 µm, and the present embodiment is not limited thereto.

For example, as illustrated by FIG. 10a, in a direction perpendicular to the base substrate 601, the first sealant 611 is disposed at a side of the first retaining wall 612 away from the base substrate 601, and is in contact with the first retaining wall 612.

For example, the height of the first retaining wall 612 is greater than the height of the first sealant 611. For example, the height of the first sealant 611 is 0.2-0.5 µm, and the present embodiment is not limited thereto.

For example, as illustrated by FIG. 10a, the first retaining wall 612 is a continuous ring of block-shape wall, the present embodiment is not limited thereto. For example, the first retaining wall can also include a plurality of continuous rings of strip-shaped retaining walls.

Figure 10C:
FIG. 10c is a sectional view of another substrate provided by an embodiment of the present embodiment.

For example, as illustrated by FIG. 10c, the sealing member 610 further includes a second retaining wall 613. The second retaining wall 613 is disposed at a side of the first sealant 611 away from the base substrate 601 in the direction perpendicular to the base substrate 601, and is in contact with the first sealant 611. The second retaining wall 613 is a continuous ring of retaining wall, and the elastic modulus of the material of the first sealant 611 is greater than elastic modulus of a material of the second retaining wall 613.

For example, as illustrated by FIG. 10c, the second retaining wall 613 includes a plurality of continuous rings of strip-shaped retaining walls, and the first retaining wall 612 includes a continuous block-shaped retaining wall. The present embodiment is not limited thereto, the first retaining wall and second retaining wall can be interchangeable, or both the first retaining wall and the second retaining wall can be a continuous ring of block-shaped retaining wall.

For example, the material of the second retaining wall 613 is the same as the material of the first retaining wall 612, the present embodiment is not limited thereto.

For example, in the direction perpendicular to the base substrate 601, a sum of heights of the second retaining wall 613 and the first retaining wall 612 is greater than the height of the first sealant 611.

For example, in the present embodiment, the height of the second retaining wall 613 is 2-3 μm, the height of the first retaining wall 612 is 1-1.5 μm, and the height of the first sealant 611 is still 0.2-0.5 μm. The height of the second retaining wall 613 and the height of the first retaining wall 612 are both greater than the height of the first sealant 611, the present embodiment is not limited thereto.

Figure 10D:
FIG. 10d is a sectional view of another substrate provided by an embodiment of the present embodiment.

For example, as illustrated by FIG. 10d, the sealing member 610 further includes a second sealant 614. In the direction perpendicular to the base substrate 601, the second sealant 614 is disposed between the first retaining wall 612 and the base substrate 601, and is in contact with the first retaining wall 612. The elastic modulus of the material of the second sealant 614 is greater than the elastic modulus of the material of the first retaining wall 612.

For example, the material of the second sealant 614 is the same as the material of the first sealant 611, the present embodiment is not limited thereto.

For example, the height of the second sealant 614 is the same as the height of the first sealant 611. For example, the height of the first sealant 611 and the second sealant 614 can be selected as 0.2-0.5 μm, the present embodiment is not limited thereto.

The substrate provided with the sealing member, provided by the present embodiment, can be attached to another substrate to form the display panel provided by the first to third embodiments. Upon being applied to a display panel, the sealing member in the present embodiment is located in the peripheral area of the display panel. The first retaining wall in the sealing member can not only increase elasticity of the sealing member to alleviate the light leakage phenomenon at a fixed position in the peripheral area of the display panel and the susceptibility to light leakage upon the panel being pressed, but also play a supporting role to the display panel to reduce the thickness of the sealant, so as to simplify the manufacturing processes of the sealant, such that the first sealant does not need to be added with a supporter such as a silicon sphere and a plastic sphere.

The following points should be explained:

(1) Unless otherwise defined, in the embodiments and accompanying drawings in the present disclosure, the same reference numeral represents the same meaning.

(2) The accompanying drawings involve only the structure(s) in connection with the embodiment(s) of the present disclosure, and other structure(s) can be referred to common design(s).

(3) For the purpose of clarity, in accompanying drawings for illustrating the embodiment(s) of the present disclosure, layer(s) or area(s) may be enlarged. However, it should understood that, in the case in which a component or element such as a layer, film, area, substrate or the like is referred to be "on" or "under" another component or element, it may be directly on or under the another component or element or a component or element is interposed therebetween.

The foregoing is only the embodiments of the present invention and not intended to limit the scope of protection of the present invention, alternations or replacements which can be easily envisaged by any skilled person being familiar with the present technical field shall fall into the protection scope of the present disclosure. Thus, the protection scope of the present disclosure should be based on the protection scope of the claims.

What is claimed is:

1. A display panel, having a display area and a peripheral area surrounding the display area, the display panel comprising:
   a first substrate;
   a second substrate, disposed opposite to the first substrate; and
   a sealing member, disposed between the first substrate and the second substrate, located in the peripheral area, and configured to hermetically connect the first substrate and the second substrate,
   wherein the sealing member comprises a first sealant and a first retaining wall, an orthographic projection of the first retaining wall on the second substrate is at least partially overlapped with an orthographic projection of the first sealant on the second substrate, and an elastic modulus of a material of the first sealant is greater than an elastic modulus of a material of the first retaining wall, and
   wherein the sealing member further comprises a second retaining wall, wherein, in a direction perpendicular to the first substrate, the second retaining wall is disposed between the first sealant and the second substrate, and is in contact with the first sealant, the second retaining wall is a continuous ring of retaining wall surrounding the display area, and the elastic modulus of the material of the first sealant is greater than an elastic modulus of a material of the second retaining wall.

2. The display panel according to claim 1, wherein the first retaining wall is disposed on the first substrate, and the first retaining wall is at least one continuous ring of retaining wall surrounding the display area.

3. The display panel according to claim 1, wherein, in the direction perpendicular to the first substrate, the first sealant is disposed at a side of the first retaining wall away from the first substrate, and is in contact with the first retaining wall.

4. The display panel according to claim 3, wherein the sealing member further comprises:
   a second sealant, wherein, in the direction perpendicular to the first substrate, the second sealant is disposed between the first retaining wall and the first substrate, and is in contact with the first retaining wall, an elastic modulus of a material of the second sealant is greater than the elastic modulus of the material of the first retaining wall.

5. The display panel according to claim 1, further comprising:
a plurality of spacers, located in the display area, and a material of the plurality of spacers is the same as the material of the first retaining wall.

6. The display panel according to claim 1, wherein, in the direction perpendicular to the first substrate, a sum of heights of the second retaining wall and the first retaining wall is greater than a height of the first sealant, or a height of the first retaining wall is greater than the height of the first sealant.

7. A display device, comprising the display panel according to claim 1.

8. The display panel according to claim 1, wherein the sealing member further comprises:
a second sealant, in the direction perpendicular to the first substrate, the second sealant is disposed between the first retaining wall and the first substrate, and is in contact with the first retaining wall, an elastic modulus of a material of the second sealant is greater than the elastic modulus of the material of the first retaining wall.

9. A manufacturing method of a display panel, comprising:
providing a first substrate;
forming a sealing member on the first substrate, wherein the forming the sealing member comprises forming a first retaining wall on the first substrate, and forming a first sealant on a side of the first retaining wall away from the first substrate, wherein an elastic modulus of a material of the first sealant is greater than an elastic modulus of a material of the first retaining wall;
providing a second substrate; and
cell-assembling a side of the first substrate on which the sealing member is formed and the second substrate to form the display panel, wherein the display panel comprises a display area and a peripheral area surrounding the display area, the sealing member is formed in the peripheral area and hermetically connects the first substrate and the second substrate,
wherein the first retaining wall is at least one continuous ring of retaining wall surrounding the display area, and wherein the forming the sealing member further comprises:
in a direction perpendicular to the first substrate, before forming the first sealant, forming a second retaining wall on the second substrate, and then forming the first sealant on the first retaining wall or the second retaining wall to connect the first retaining wall and the second retaining wall, wherein the second retaining wall is a continuous ring of retaining wall surrounding the display area, and the elastic modulus of the material of the first sealant is greater than an elastic modulus of a material of the second retaining wall.

10. The manufacturing method of the display panel according to claim 9, wherein the forming the sealing member further comprises:
in the direction perpendicular to the first substrate, forming the first sealant on the side of the first retaining wall away from the first substrate to connect the first retaining wall and the second substrate.

11. The manufacturing method of the display panel according to claim 9, wherein the forming the sealing member further comprises:
in the direction perpendicular to the first substrate, before forming the first retaining wall, forming a second sealant on the first substrate, and then forming the first retaining wall on the second sealant,
wherein an elastic modulus of a material of the second sealant is greater than the elastic modulus of the material of the first retaining wall.

12. The manufacturing method of the display panel according to claim 9, further comprising:
forming a plurality of spacers in the display area of a side of the first substrate facing the second substrate, wherein the plurality of spacers and the first retaining wall are formed through a same patterning process.

13. A substrate, comprising:
a base substrate; and
a sealing member, disposed in a peripheral area of the base substrate, wherein the sealing member comprises a first sealant and a first retaining wall, an orthographic projection of the first retaining wall on the base substrate is at least partially overlapped with an orthographic projection of the first sealant on the base substrate, and an elastic modulus of a material of the first sealant is greater than an elastic modulus of a material of the first retaining wall, and
wherein the sealing member further comprises a second retaining wall, wherein, in a direction perpendicular to the base substrate, the second retaining wall is disposed on a side of the first sealant away from the base substrate, and is in contact with the first sealant, the second retaining wall is a continuous ring of retaining wall, and the elastic modulus of the material of the first sealant is greater than an elastic modulus of a material of the second retaining wall.

14. The substrate according to claim 13, wherein the first retaining wall is disposed on the base substrate, and the first retaining wall is at least one continuous ring of retaining wall.

15. The substrate according to claim 13, wherein, in the direction perpendicular to the base substrate, the first sealant is disposed at a side of the first retaining wall away from the base substrate, and is in contact with the first retaining wall.

16. The substrate according to claim 15, wherein the sealing member further comprises:
a second sealant, in the direction perpendicular to the base substrate, the second sealant is disposed between the first retaining wall and the base substrate, and is in contact with the first retaining wall, an elastic modulus of a material of the second sealant is greater than the elastic modulus of the material of the first retaining wall.

17. The substrate according to claim 13, wherein, in the direction perpendicular to the base substrate, a sum of heights of the second retaining wall and the first retaining wall is greater than a height of the first sealant, or a height of the first retaining wall is greater than the height of the first sealant.

* * * * *